United States Patent
Sohgawa et al.

(10) Patent No.: US 9,396,417 B2
(45) Date of Patent: Jul. 19, 2016

(54) IMAGE PROCESSING APPARATUS, COMPUTER-READABLE RECORDING MEDIUM, AND IMAGE PROCESSING METHOD TO FORM AN IMAGE OF IMPROVED QUALITY

(71) Applicants: Norimasa Sohgawa, Kanagawa (JP); Shinichi Hatanaka, Tokyo (JP)

(72) Inventors: Norimasa Sohgawa, Kanagawa (JP); Shinichi Hatanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/616,838

(22) Filed: Feb. 9, 2015

(65) Prior Publication Data

US 2015/0242726 A1     Aug. 27, 2015

(30) Foreign Application Priority Data

Feb. 25, 2014    (JP) ................................ 2014-034566

(51) Int. Cl.
G06F 15/00     (2006.01)
G06K 15/10     (2006.01)
G06K 1/00     (2006.01)

(52) U.S. Cl.
CPC .................................... *G06K 15/107* (2013.01)

(58) Field of Classification Search
CPC ............ G06K 15/1823; G06K 15/102; H04N 1/00307; H04N 1/00411; H04N 1/00912; H04N 1/21; H04N 1/32106

USPC ........................... 358/1.1, 1.8, 1.9, 1.13, 1.18
See application file for complete search history.

(56) References Cited

U.S. PATENT DOCUMENTS

| 6,328,418 B1 * | 12/2001 | Yamada et al. ................. 347/40 |
| 8,632,174 B2 | 1/2014 | Noguchi et al. |
| 2014/0015898 A1 * | 1/2014 | Yamada et al. ................. 347/43 |

FOREIGN PATENT DOCUMENTS

| JP | 2012-096528 | 5/2012 |
| JP | 2013-094734 | 5/2013 |

* cited by examiner

*Primary Examiner* — Gabriel Garcia
(74) *Attorney, Agent, or Firm* — Cooper & Dunham LLP

(57) ABSTRACT

An image processing apparatus that outputs print data to a recording apparatus including a recording unit that causes each of a plurality of nozzles to eject droplets to record dots on a recording medium, the image processing apparatus comprises: an acquiring module that acquires image data for an image to be formed by the recording unit; a determining module that determines whether or not the image data is laminated image data formed of a plurality of layers; and a generating module that generates, when the image data is the laminated image data, the print data that assigns nozzles for recording dots corresponding to respective pixels of the laminated image data such that a specific nozzle for recording dots that correspond to pixels at an identical pixel position in the laminated image data varies from one layer to another.

8 Claims, 10 Drawing Sheets

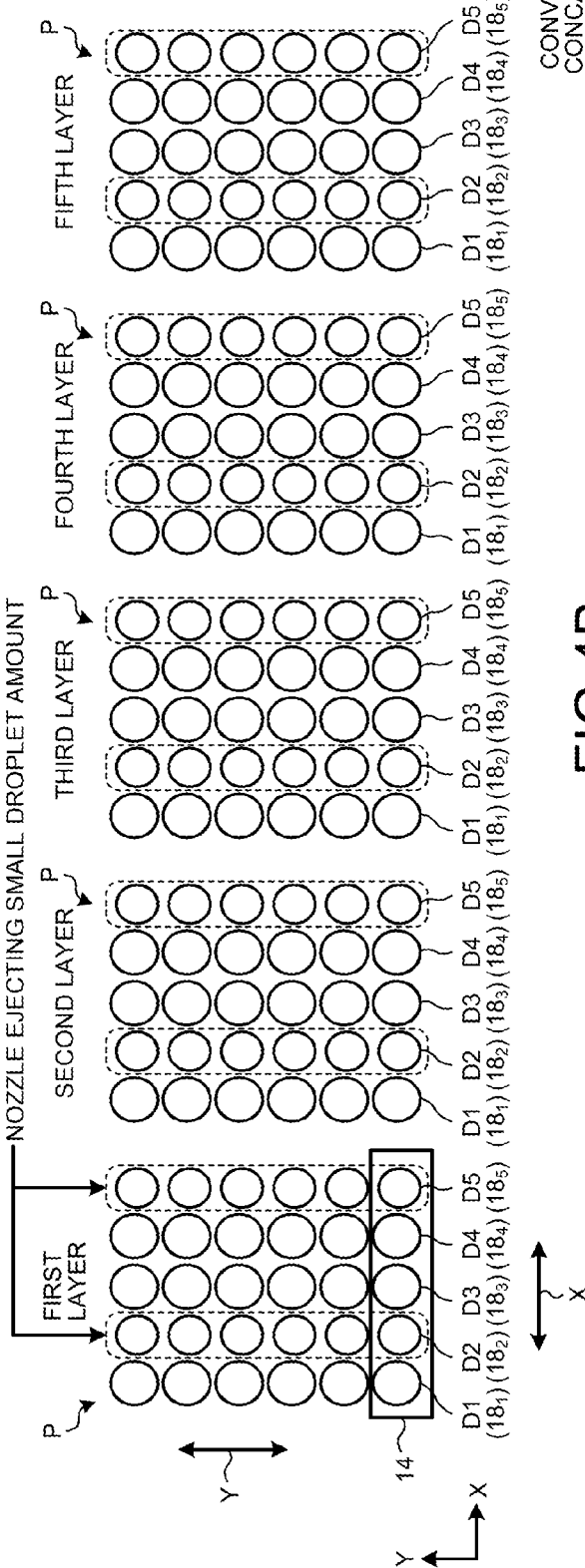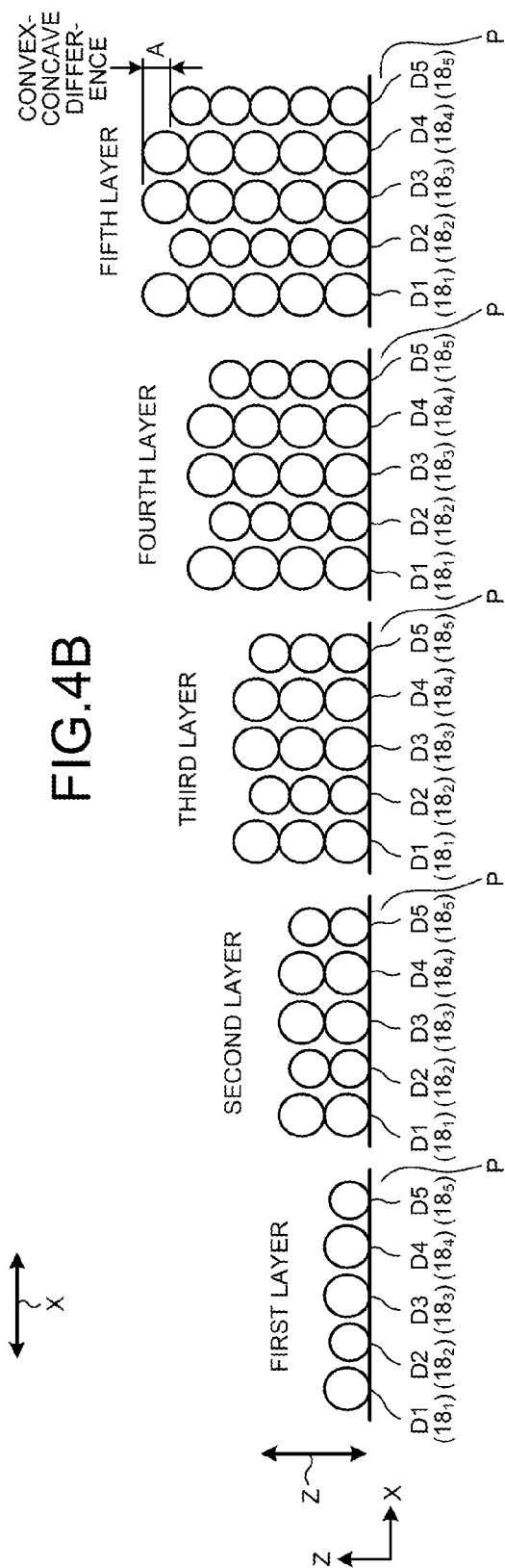

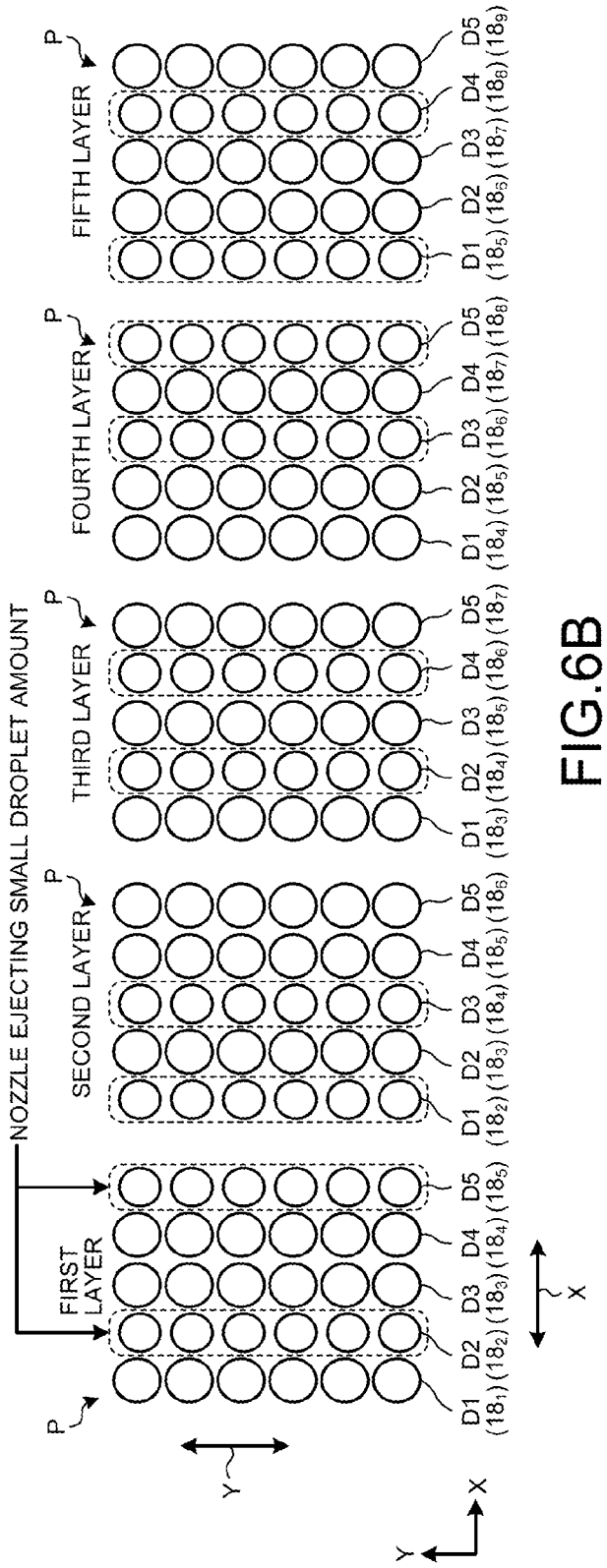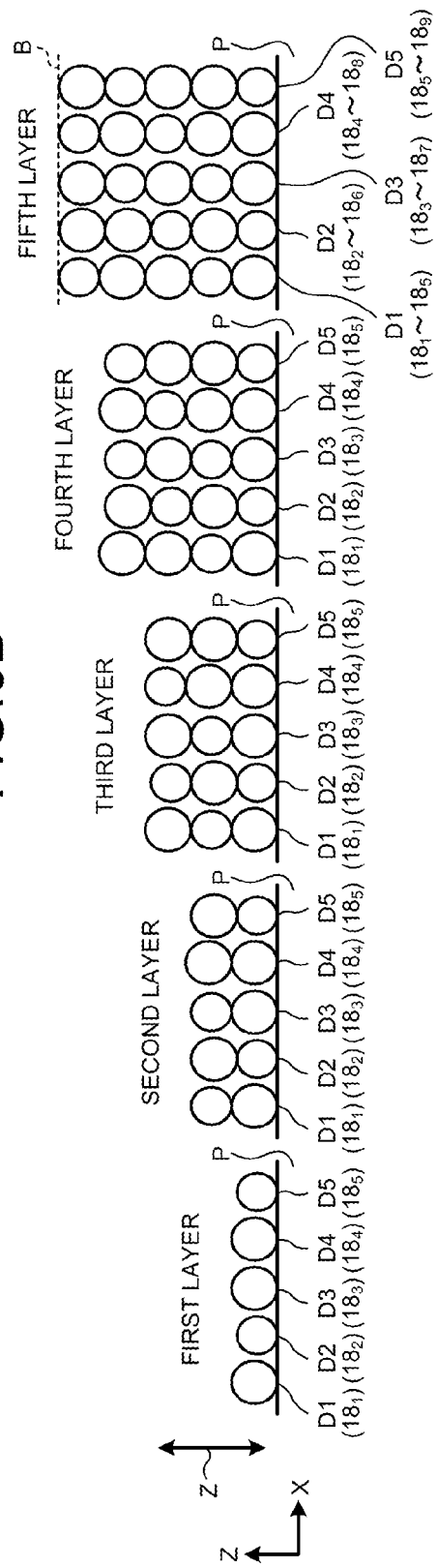

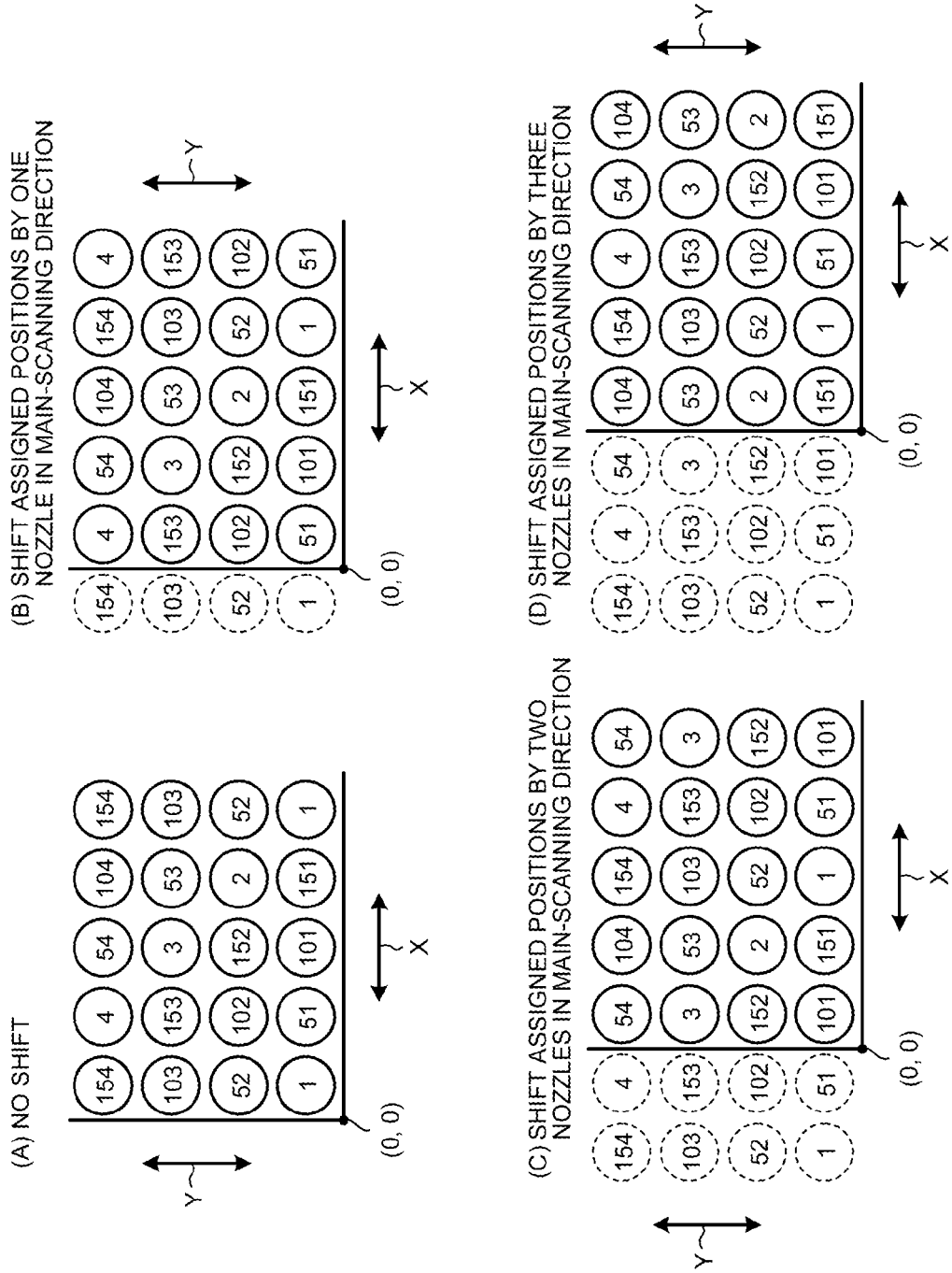

IMAGE PROCESSING APPARATUS, COMPUTER-READABLE RECORDING MEDIUM, AND IMAGE PROCESSING METHOD TO FORM AN IMAGE OF IMPROVED QUALITY

CROSS-REFERENCE TO RELATED APPLICATIONS

The present application claims priority to and incorporates by reference the entire contents of Japanese Patent Application No. 2014-034566 filed in Japan on Feb. 25, 2014.

BACKGROUND OF THE INVENTION

1. Field of the Invention

The present invention relates to an image processing apparatus, a computer-readable recording medium having an image processing program, and an image processing method.

2. Description of the Related Art

Known recording apparatuses by an inkjet method form images by ejecting ink or other droplets from nozzles. Techniques have also been developed that reduce uneven color or streaks that arise from dots overlapping unique to the inkjet method. One disclosed example of such techniques prevents streaks and unevenness by forming, over a layer of dots ejected earlier, dots with a smaller ejection amount than in the dots ejected earlier.

To form a laminated image formed by superimposing one dot on top of another, the greater the number of layers, the more frequently surface irregularities of the laminated image occur due to, for example, accumulation of uneven ejection by nozzles that eject droplets, resulting in degraded image quality.

In view of the foregoing problem, there is a need to provide an image processing apparatus, a computer-readable recording medium having an image processing program, and an image processing method capable of generating print data that can form a laminated image with minimized degradation of image quality.

SUMMARY OF THE INVENTION

It is an object of the present invention to at least partially solve the problems in the conventional technology.

According to the present invention, there is provided an image processing apparatus that outputs print data to a recording apparatus including a recording unit that causes each of a plurality of nozzles to eject droplets to record dots on a recording medium, the image processing apparatus comprising: an acquiring module that acquires image data for an image to be formed by the recording unit; a determining module that determines whether or not the image data is laminated image data formed of a plurality of layers; and a generating module that generates, when the image data is the laminated image data, the print data that assigns nozzles for recording dots corresponding to respective pixels of the laminated image data such that a specific nozzle for recording dots that correspond to pixels at an identical pixel position in the laminated image data varies from one layer to another.

The present invention also provides a non-transitory computer-readable recording medium that contains an image processing program that causes a computer to execute: acquiring image data for an image to be formed by a recording unit that causes each of a plurality of nozzles to eject droplets to record dots on a recording medium; determining whether or not the image data is laminated image data formed of a plurality of layers; and generating, when the image data is the laminated image data, print data that assigns nozzles for recording dots corresponding to respective pixels of the laminated image data such that a specific nozzle for recording dots that correspond to pixels at an identical pixel position in the laminated image data varies from one layer to another.

The present invention also provides an image processing method comprising: acquiring image data for an image to be formed by a recording unit that causes each of a plurality of nozzles to eject droplets to record dots on a recording medium; determining whether or not the image data is laminated image data formed of a plurality of layers; and generating, when the image data is the laminated image data, print data that assigns nozzles for recording dots corresponding to respective pixels of the laminated image data such that a specific nozzle for recording dots that correspond to pixels at an identical pixel position in the laminated image data varies from one layer to another.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4A and 4B are diagrams illustrating a traditional laminated image;

FIGS. 6A and 6B are diagrams illustrating a laminated image;

FIG. 12 that includes parts (A) to (D) is diagram illustrating another method for changing the assigned positions.

DETAILED DESCRIPTION OF THE PREFERRED EMBODIMENTS

The following describes an image processing apparatus, a computer-readable recording medium having an image processing program, and an image processing method according to an embodiment of the present invention in detail with reference to the accompanying drawings.

Figure 1:
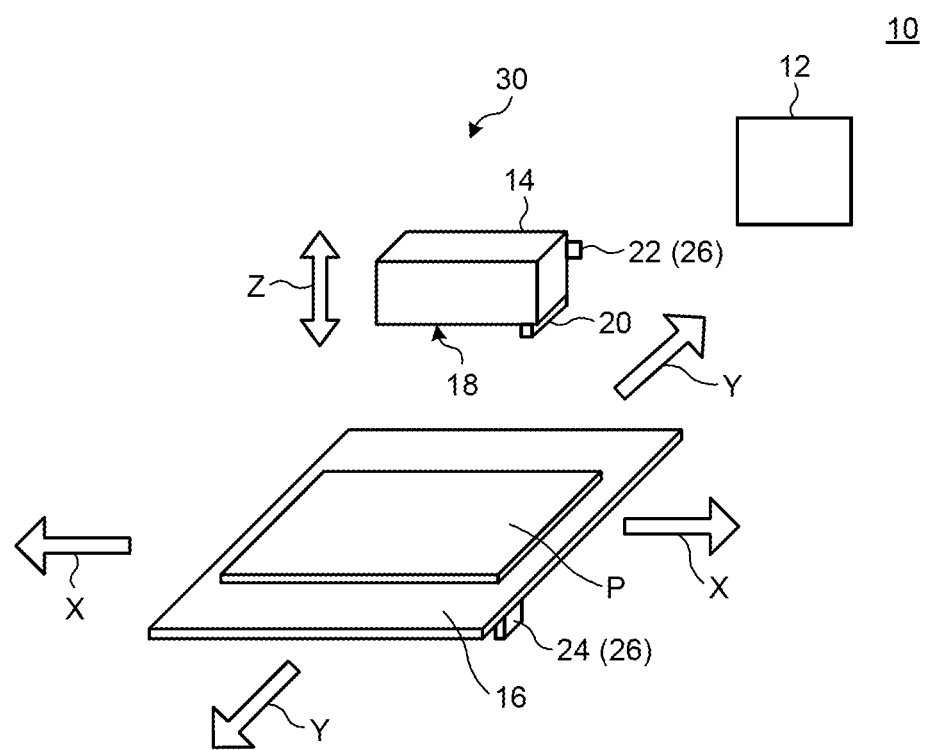
FIG. 1 is a diagram illustrating an exemplary image processing system that includes an image processing apparatus according to an embodiment of the present invention and a recording apparatus receiving a print data from the image processing apparatus.

FIG. 1 is a diagram illustrating an exemplary image processing system 10.

The image processing system 10 includes an image processing apparatus 12 and a recording apparatus 30. The image processing apparatus 12 and the recording apparatus 30 are connected to each other so as to be capable of communicating with each other.

The recording apparatus 30 includes a recording unit 14, a working stage 16, and a drive unit 26. The recording unit 14 includes a plurality of nozzles 18. The recording unit 14 operates according to the inkjet method, causing each of the nozzles 18 to eject droplets to thereby record dots. The nozzles 18 are disposed on a surface of the recording unit 14 facing the working stage 16.

In the embodiment, the droplets are ink including a coloring material. In the embodiment, the ink contains an optically curable resin cured when irradiated with light. The droplets ejected by the recording unit 14 are not limited to the ink containing the optically curable resin.

The surface of the recording unit 14 facing the working stage 16 has an irradiation unit 20. The irradiation unit 20 irradiates a recording medium P with light having a wavelength that cures the ink ejected from the nozzles 18.

The working stage 16 holds the recording medium P to which ink is ejected. The drive unit 26 relatively moves the recording unit 14 and the working stage 16 in a vertical direction (in a direction of an arrow Z in FIG. 1), a main-scanning direction X perpendicular to the vertical direction Z, and a sub-scanning direction Y perpendicular to the vertical direction Z and the main-scanning direction X.

In the embodiment, a plane formed by the main-scanning direction X and the sub-scanning direction Y corresponds to an XY plane in the working stage 16 extending along a surface of the working stage 16 facing the recording unit 14.

The drive unit 26 includes a first drive part 22 and a second drive part 24. The first drive part 22 moves the recording unit 14 in the vertical direction Z, in the main-scanning direction X, and in the sub-scanning direction Y. The second drive part 24 moves the working stage 16 in the vertical direction Z, in the main-scanning direction X, and in the sub-scanning direction Y. It is noted that the recording apparatus 30 may be configured to include either the first drive part 22 or the second drive part 24.

Figure 2A:
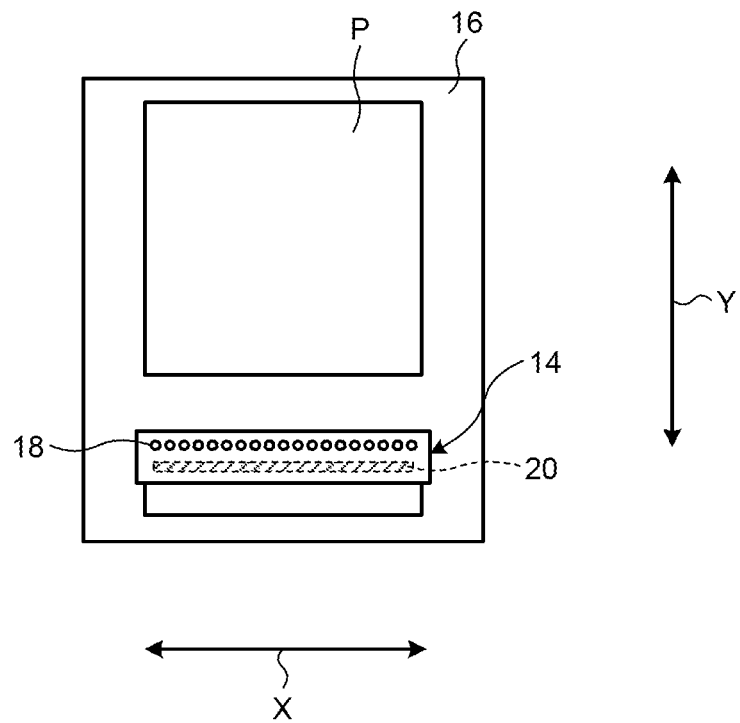
FIGS. 2A and 2B are diagrams illustrating a recording unit included in the recording apparatus.
Figure 2B:
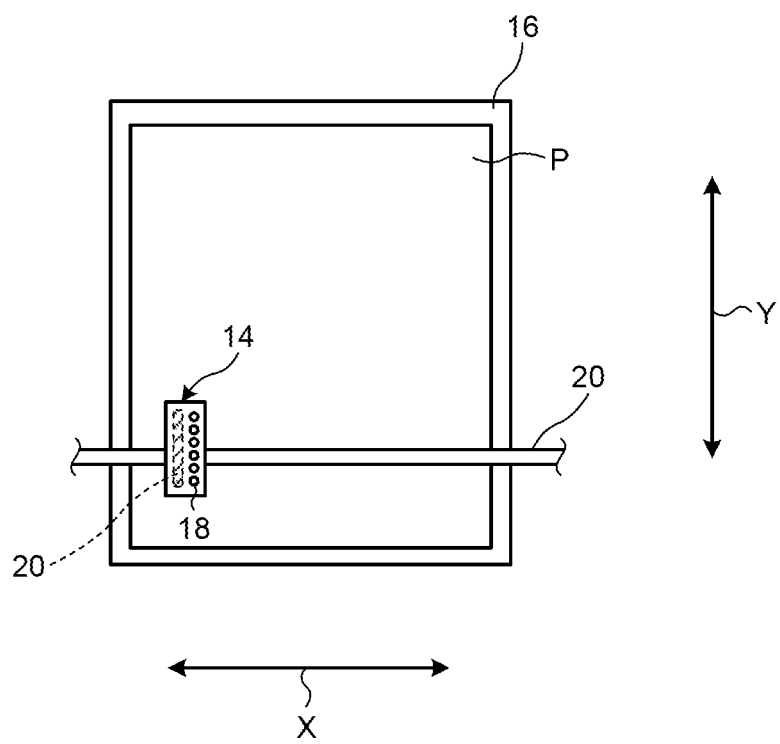

FIGS. 2A and 2B illustrate the recording unit 14.

FIG. 2A illustrates the recording unit 14 employing a one-pass system (also referred to as a single-pass system). The one-pass system forms an image by moving the recording medium P past the recording unit 14 relatively in the sub-scanning direction Y. In this case, the recording unit 14 includes the nozzles 18 arranged at least in the main-scanning direction X. The recording unit 14 may nonetheless include the nozzles 18 arranged in both the main-scanning direction X and the sub-scanning direction Y. The recording unit 14 is disposed at a fixed position with respect to the recording medium P in the main-scanning direction X. An image is formed on the recording medium P by moving the recording unit 14 and the recording medium P with respect to each other in the sub-scanning direction Y, while causing the nozzles 18 of the recording unit 14 to eject ink. For a laminated image formed by superimposing an image on top of another in a layered pattern, the image of each layer is formed by moving the recording medium P relatively in the vertical direction Z.

FIG. 2B illustrates the recording unit 14 employing a multi-pass system. The multi-pass system forms an image by reciprocating the recording unit 14 in the main-scanning direction X relative to the recording medium P, while relatively moving the recording medium P in the sub-scanning direction Y. In this case, the recording unit 14 includes the nozzles 18 arranged, for example, in both the main-scanning direction X and the sub-scanning direction Y. The recording unit 14 may nonetheless include the nozzles 18 arranged in either the main-scanning direction X or the sub-scanning direction Y. For a laminated image formed by superimposing an image on top of another in a layered pattern, the image of each layer is formed by moving the recording medium P relatively in the vertical direction Z.

It is noted that, in FIGS. 2A and 2B, the nozzles 18 are disposed on the surface of the recording unit 14 facing the working stage 16. Specifically, each of the nozzles 18 is disposed so as to be capable of ejecting ink toward the side of the working stage 16.

Figure 3:
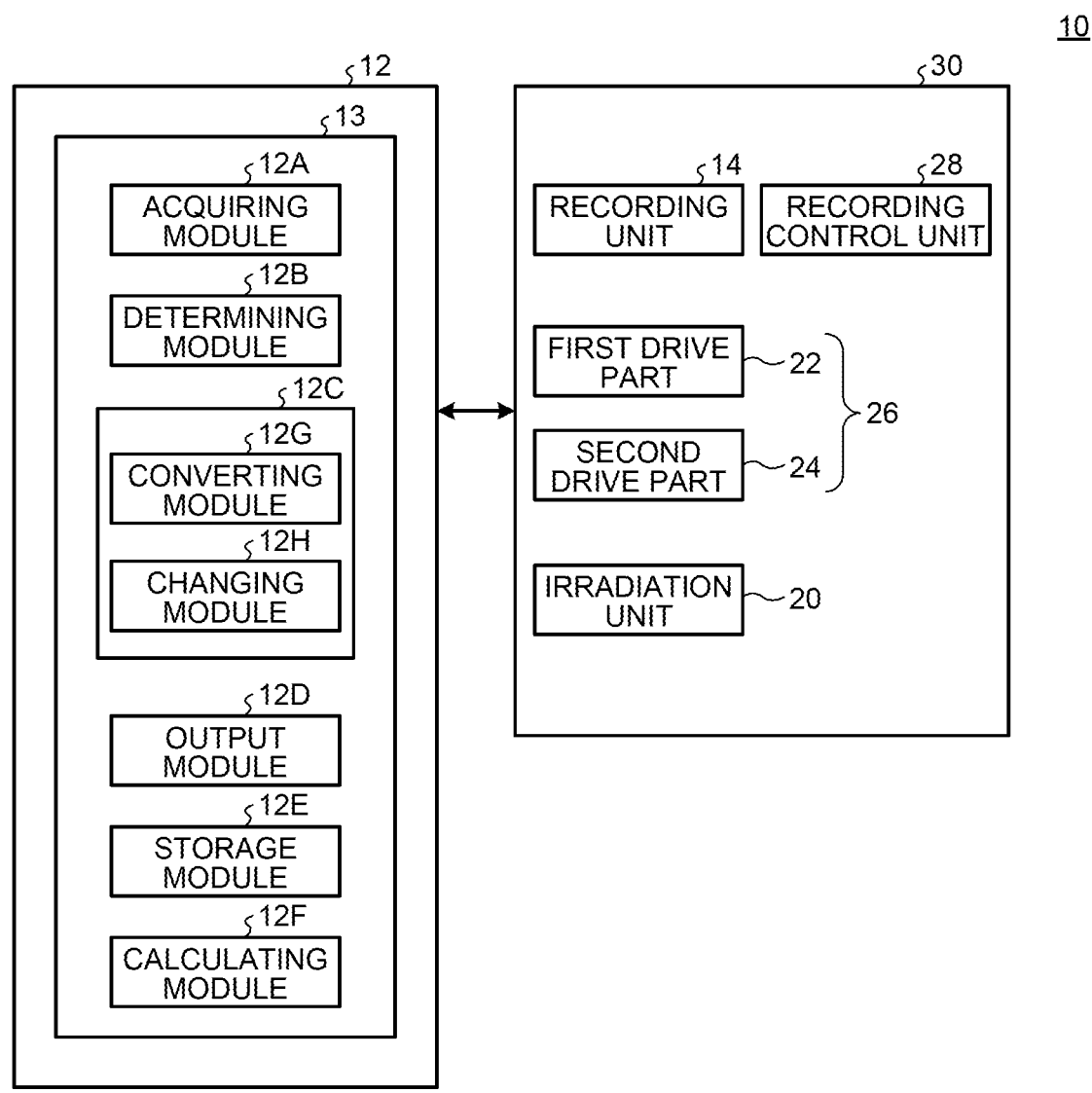
FIG. 3 is a functional block diagram illustrating the image processing system.

FIG. 3 is a functional block diagram illustrating the image processing system 10.

The image processing apparatus 12 includes a main controller 13. The main controller 13 is a computer that includes, for example, a central processing unit (CPU) and controls entire the image processing apparatus 12. The main controller 13 may nonetheless be configured to include any device other than a general-purpose CPU. For example, the main controller 13 may be formed of circuits, for example.

The main controller 13 includes an acquiring module 12A, a determining module 12B, a generating module 12C, an output module 12D, a storage module 12E, and a calculating module 12F. The generating module 12C includes a converting module 12G and a changing module 12H.

The acquiring module 12A, the determining module 12B, the generating module 12C (the converting module 12G, the changing module 12H), the output module 12D, and the calculating module 12F may be achieved in part or in whole by, for example, causing a processor such as a CPU to execute a program, specifically, by software, or by hardware such as an integrated circuit (IC), or both.

The acquiring module 12A acquires image data. The image data is formed by the recording unit 14 of the recording apparatus 30. The acquiring module 12A may acquire the image data from an external device via a communication module not illustrated or a storage unit, not illustrated, disposed in the image processing apparatus 12.

The image data may be, for example, in a vector format or a raster format. The embodiment will be described for a case in which image data in the vector format is acquired.

In the embodiment, the acquiring module 12A acquires image data of a dot image of a single layer or laminated image data of a laminated image formed of at least a dot image of one layer superimposed on top of another dot image of another layer. Specifically, the laminated image data represents image data formed by placing a plurality of dots one on top of each other at a position corresponding to an identical pixel position on the recording medium P.

In the following, image data formed of dots of a single layer will be referred to as single-layer image data.

The single-layer image data includes image data for forming an image of a single layer. The laminated image data includes image data for forming images of a plurality of layers. The laminated image data includes, for example, a plurality of pieces of image data, each image data forming an image of each layer, and layer information that indicates which layer is the image in question as counted when the layer adjacent to the recording medium P is the first layer. The laminated image data is not limited to the foregoing data format and any other data format that forms images of a plurality of layers may be used.

The determining module 12B determines whether or not the image data acquired by the acquiring module 12A is laminated image data. In the embodiment, the determining module 12B determines whether the image data acquired by the acquiring module 12A is laminated image data or single-layer image data.

The determining module 12B, for example, determines whether or not the image data acquired by the acquiring module 12A contains image data for a plurality of layers to thereby determine whether or not the image data acquired by the acquiring module 12A is laminated image data. Instead, the image data acquired by the acquiring module 12A may include identification information for identifying whether the image data acquired by the acquiring module 12A is laminated image data or single-layer image data. In this case, the determining module 12B has only to read the identification information included in the image data acquired by the acquiring module 12A to determine whether the image data acquired by the acquiring module 12A is laminated image data or not.

Using the image data acquired by the acquiring module 12A, the generating module 12C generates print data that enables the recording unit 14 of the recording apparatus 30 to form an image. Specifically, the generating module 12C includes the converting module 12G and the changing module 12H.

The converting module 12G converts, for each pixel, the image data acquired by the acquiring module 12A to a raster format indicating a density value. The converting module 12G also converts a color space so that colors of the image data are colors corresponding to a color space by colors of ink ejected by the recording unit 14. For example, the converting module 12G converts a color space represented by an RGB format to a color space in a CMYK format.

The converting module 12G assigns a nozzle 18 that records a dot corresponding to each of pixels that form the image data. Assume, for example, that the recording unit 14 includes the nozzles 18 arranged in plurality ($18_1$ to $18_n$) (n is an integer of 2 or more) in the main-scanning direction X. In this case, for example, the converting module 12G reads image data for each pixel row (one line) extending in a direction corresponding to the main-scanning direction X and assigns a nozzle $18_1$ to the pixel on a first end in the pixel row in the main-scanning direction X and assigns each of nozzles $18_2$ to $18_n$ to a corresponding one of pixels arranged toward a second end in the main-scanning direction X.

Thereby, the generating module 12C generates print data.

Hitherto, a case of streaks or unevenness has been visually recognized in a laminated image formed on the recording medium P by superimposing a dot image of one layer on top of another dot image of another layer due to irregularities (convexes and concaves) occurring from, for example, variations in an amount of ink ejected from the nozzles 18 and inclination in an ejection direction.

FIGS. 4A and 4B illustrates a traditional laminated image.

FIG. 4A is a plan view illustrating an XY plane of the traditional laminated image. FIG. 4B is a cross-sectional view taken in the vertical direction Z of the traditional laminated image.

Assume a case in which, of the nozzles $18_1$ to $18_5$ arranged in the main-scanning direction X, an amount of ink ejected from each of the nozzle $18_2$ and the nozzle $18_5$ is smaller than an amount of ink ejected from each of other normal nozzles 18 as illustrated in FIGS. 4A and 4B. It is assumed that a signal for ejecting an identical amount of ink is applied to each of drive elements, not illustrated, for driving the respective nozzles $18_1$ to $18_5$. Assume further that ink is ejected in sequence also in the sub-scanning direction Y as the recording unit 14 is moved in the sub-scanning direction Y relative to the recording medium P.

In this case, areas of dots (see a dot D2 and a dot D5 in FIGS. 4A and 4B) recorded by the nozzles 18 from each of which a small amount of ink is ejected (the nozzle $18_2$ and the nozzle $18_5$ in FIGS. 4A and 4B) have a height lower than a height of areas of dots (see a dot D1 and dots D3 and D4 in FIGS. 4A and 4B) recorded by the nozzles 18 from each of which a normal amount of ink is ejected (the nozzles $18_1$ and the nozzle $18_3$ to $18_4$ in FIGS. 4A and 4B). This results in convexes and concaves being produced on the surface of the formed image. When a laminated image is formed in which dots corresponding to a pixel at an identical pixel position are recorded with an identical nozzle 18 and these dots are placed on top of each other, a greater difference between the convexes and the concaves on the surface of the laminated image results with a greater number of layers (see a convex-concave difference A in FIG. 4B). Such convexes and concaves on the surface are visually recognized as streaks and unevenness.

More specifically, for example, the greater the number of layers of dots from a first layer toward a fifth layer on the recording medium P, the greater the convex-concave difference on the surface as illustrated in FIG. 4B.

One known method adjusts a feed amount of the recording medium P to thereby reduce variations in the ejection amount. Unfortunately, however, this traditional method is unable to reduce surface irregularities of the laminated image.

Figure 5:
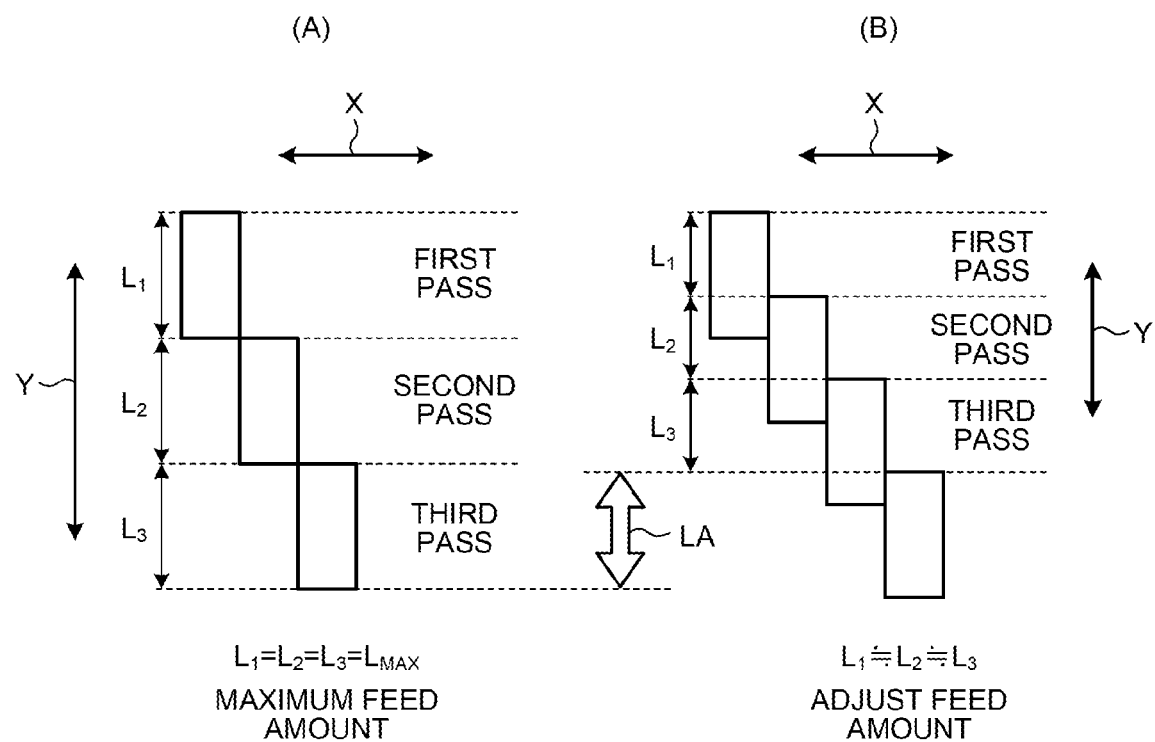
FIG. 5 that includes parts (A) and (B) is diagram illustrating a traditional method for adjusting a feed amount of a recording medium.

FIG. 5 illustrates the traditional method for adjusting the feed amount of the recording medium P. As illustrated in FIG. 5, a method is known in the recording unit 14 that employs the one-pass system to adjust the feed amount of the recording medium P in order to reduce variations in ejection. A part (A) of FIG. 5 illustrates a method in which ink is ejected, while the recording medium P is fed in the sub-scanning direction Y at a maximum feed amount ($L_{Max}$) (feed amounts $L_1$ to $L_3=L_{Max}$). This method, though offering a high productivity, is affected by the variations in ejection and the feed amount at regular intervals, thus producing a convex-concave difference on the surface of the image.

A part (B) of FIG. 5 illustrates a method for adjusting the feed amount in a range smaller than the maximum feed amount ($L_{Max}$). Because of a difference in a print area to be formed by the same scan (see LA in FIG. 5), however, this method yields a low productivity. In the method illustrated in the part (B) of FIG. 5, the feed amount of the recording medium P in the sub-scanning direction Y is not constant, so that in-plane light emission time varies, resulting in variations in the degree of curing of the ejected ink, which produces a convex-concave difference on the surface of the image.

Reference is made back to FIG. 3. If the image data acquired by the acquiring module 12A is the laminated image data, the generating module 12C of the image processing apparatus 12 according to the embodiment generates print data to be detailed in the following. Specifically, the generating module 12C generates print data that assigns the nozzles 18 for recording dots corresponding to respective pixels of the laminated image data such that a specific nozzle 18 for recording a dot D that corresponds to a pixel at an identical pixel position in the laminated image data varies from one layer to another.

Specifically, the generating module 12C includes the changing module 12H. For each layer of the laminated image data, the changing module 12H changes an assigned position of a nozzle 18 that corresponds to each pixel of the laminated image data.

The changing module 12H changes the assigned position as follows. Assume, for example, that the recording unit 14 employs the one-pass system as illustrated in FIG. 2A. Assume further that the recording unit 14 includes the nozzles 18 arranged in the main-scanning direction X. In this case, the changing module 12H changes the assigned positions of the nozzles 18 such that the nozzle 18 for recording dots corresponding to pixels at the identical pixel position in the laminated image data is shifted, among different layers, in a predetermined shifting amount in a direction that corresponds to a direction in which the nozzles 18 are arranged.

The moving direction and the shifting amount may be set according to print conditions. The print conditions include, for example, a print direction, print resolution, a direction in which the recording medium P is moved during printing, and a print speed. Specifically, the moving direction may be, for example, a direction that corresponds to a print direction in the direction in which the nozzles 18 are arranged. The shifting amount is exemplarily set to be smaller at higher print resolution. Alternatively, the shifting amount is set to be smaller at higher print speeds and the shifting amount is set to be greater at lower print speeds.

FIGS. 6A and 6B illustrate the laminated image according to the embodiment. FIGS. 6A and 6B illustrate a case in which the laminated image is formed by the recording unit 14 according to the print data changed by the changing module 12H according to the embodiment. More specifically, FIGS. 6A and 6B illustrate a case in which print data is generated as follows. The changing module 12H shifts, among different layers, the nozzle 18 that records the dot corresponding to the pixel at the identical pixel position, one by one nozzle, in a direction that corresponds to a direction in which the nozzles 18 are arranged (e.g., in the main-scanning direction X).

FIG. 6A is a plan view illustrating an XY plane of the laminated image. FIG. 6B is a cross-sectional view taken in the vertical direction Z of the laminated image.

In the same way as in FIGS. 4A and 4B, assume a case in which, of the nozzles $18_1$ to $18_5$ arranged in the main-scanning direction X, the amount of ink ejected from each of the nozzle $18_2$ and the nozzle $18_5$ is smaller than the amount of ink ejected from each of other normal nozzles 18. It is assumed that a signal for ejecting an identical amount of ink is applied to each of drive elements, not illustrated, for driving the respective nozzles $18_1$ to $18_5$. Assume further that ink is ejected in sequence also in the sub-scanning direction Y as the recording unit 14 is moved in the sub-scanning direction Y relative to the recording medium P.

In the embodiment, the changing module 12H changes the assigned position of the nozzle 18 corresponding to each pixel for each layer in the laminated image data. In the example illustrated in FIGS. 6A and 6B, the print data is generated as follows. The changing module 12H shifts, among different layers, the nozzle 18 that records the dot corresponding to the pixel at the identical pixel position, one by one nozzle, in the direction that corresponds to the direction in which the nozzles 18 are arranged (mainly in the main-scanning direction X in FIGS. 6A and 6B).

Specifically, in the example illustrated in FIGS. 6A and 6B, nozzles $18_1$ to $18_5$ are each assigned as the nozzle 18 for recording each of the dots D1 to D5 corresponding to pixel positions 1 to 5 (not illustrated), respectively, for a first layer. For a second layer, the assigned positions are changed by shifting by one nozzle such that nozzles $18_2$ to $18_6$ are each assigned as the nozzle 18 for recording each of the dots D1 to D5 corresponding to the pixel positions 1 to 5 (not illustrated), respectively. For a third layer, the assigned positions are changed by shifting by one nozzle such that nozzles $18_3$ to $18_7$ are each assigned as the nozzle 18 for recording each of the dots D1 to D5 corresponding to the pixel positions 1 to 5 (not illustrated), respectively. For a fourth layer, the assigned positions are changed by shifting by one nozzle such that nozzles $18_4$ to $18_8$ are each assigned as the nozzle 18 for recording each of the dots D1 to D5 corresponding to the pixel positions 1 to 5 (not illustrated), respectively. For a fifth layer, the assigned positions are changed by shifting by one nozzle such that nozzles $18_5$ to $18_9$ are each assigned as the nozzle 18 for recording each of the dots D1 to D5 corresponding to the pixel positions 1 to 5 (not illustrated), respectively.

The foregoing arrangement results in the following. As illustrated in FIGS. 6A and 6B, even at an identical pixel position, the nozzle 18 that ejects ink according to the pixel at the pixel position during recording of the first layer differs from the nozzle 18 that ejects ink according to the pixel at the pixel position during recording of the second layer. In the example illustrated in FIGS. 6A and 6B, the nozzle 18 for recording the dots corresponding to the pixels at the identical pixel position is shifted one by one nozzle in the main-scanning direction X according to the number of layers of the dots.

As described above, the changing module 12H changes the assigned positions of the nozzles 18 such that the nozzle 18 for recording the dot corresponding to the identical pixel position varies between one layer to another. This arrangement enables the recording unit 14 to form a laminated image with minimized surface irregularities even with a large number of layers involved in the laminated image by forming the laminated image using the print data changed by the changing module 12H (see a plane B in FIG. 6B).

The example illustrated in FIGS. 6A and 6B has been described for a case in which the nozzle 18 to be assigned is moved by one nozzle in the main-scanning direction X. The direction in which the nozzle is moved and the amount over which the nozzle is moved are not, however, limited to the main-scanning direction X and by one nozzle, respectively.

The following describes in detail a method performed by the changing module 12H to change the assigned position of the nozzle.

FIGS. 7A and 7B, and 8A and 8B illustrate the method for changing the assigned positions of the nozzles 18 in the recording unit 14 that employs the single-pass system. Assume that, in FIGS. 7A and 7B, and 8A and 8B, the recording unit 14 includes the nozzles 18 arranged in plurality ($18_1$ to $18_n$) (n is an integer of 2 or more) in the main-scanning direction X.

Figure 7A:
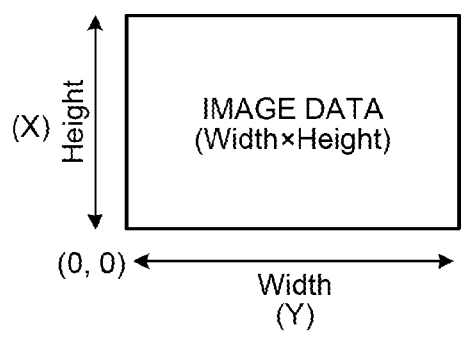
FIGS. 7A and 7B are diagrams illustrating a method for changing assigned positions of nozzles.
Figure 7B:
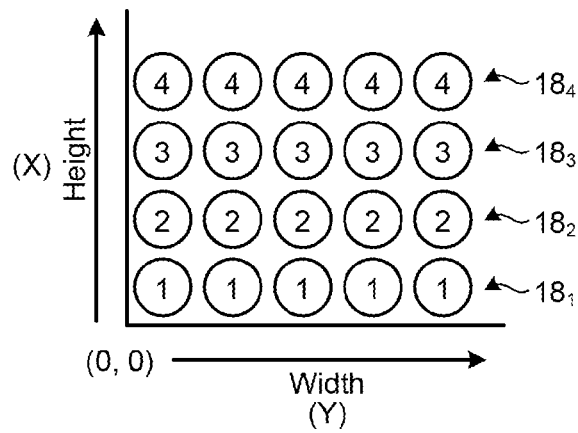

FIGS. 7A and 7B illustrate the nozzles 18 assigned by the converting module 12G during conversion of the image data. FIG. 7A schematically illustrates image data for one layer in the laminated image data. FIG. 7B schematically illustrates the nozzles 18 for recording the dots corresponding to respective pixels assigned by the converting module 12G to the image data of each layer. In FIG. 7B, encircled numbers denote identification information (hereinafter referred to as a channel) of the nozzles 18 arranged in the recording unit 14.

For example, when converting the image data acquired by the acquiring module 12A to print data, the converting module 12G assigns by default a predetermined nozzle 18 for recording the dot corresponding to each of the pixels that form the image data. For example, the converting module 12G reads the image data for each pixel row (one line) extending in a direction corresponding to the main-scanning direction X and assigns a nozzle $18_1$ identified by channel "1" to the pixel at a pixel position on a first end in the pixel row in the main-scanning direction X. In addition, the converting module 12G assigns each of nozzles $18_2$ to $18_n$ identified by channels "2" to "n" to a corresponding one of the pixels arranged toward a second end in the main-scanning direction X.

Figure 8A:
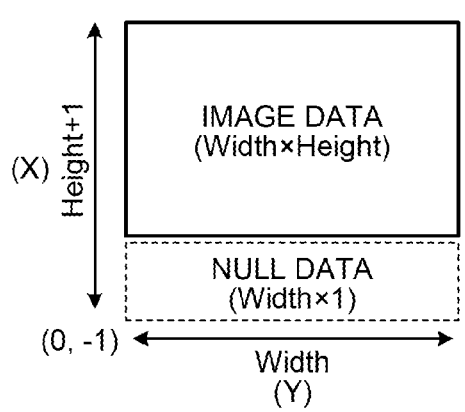
FIGS. 8A and 8B are diagrams illustrating a method for changing assigned positions of nozzles.
Figure 8B:
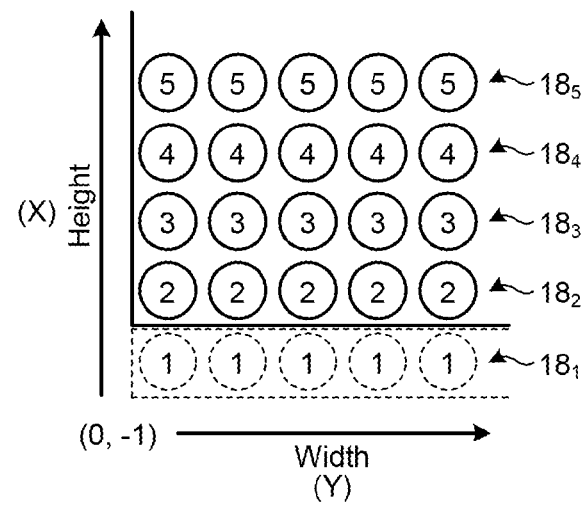

FIG. 8A schematically illustrates image data on a second layer in the laminated image data. FIG. 8B schematically illustrates the image data on the second layer having the assigned positions of the nozzles 18 changed by the changing module 12H. In FIG. 8B, encircled numbers denote the channels of the nozzles 18 arranged in the recording unit 14.

As illustrated in FIG. 8A, the changing module 12H inserts null data for one line on the first end in the main-scanning direction X in the image data (before the assigned positions are changed) on the second layer.

The insertion of the null data results in print data being generated as illustrated in FIG. 8B. The print data is generated such that the changing module 12H causes ink to be ejected from each of the nozzles $18_2$ to $18_n$ adjacent in the main-scanning direction X to the nozzle $18_1$ identified by channel "1" and disposed on the first end in the main-scanning direction X in the recording unit 14, while not allowing the nozzle $18_1$ to eject ink. Specifically, the changing module 12H shifts by one nozzle the nozzles 18 for recording the dots corresponding to respective pixels on the first layer in the direction in which the nozzles 18 are arranged (in the main-scanning direction X in FIG. 8B). The changing module 12H thereby changes the assigned positions of the nozzles 18 corresponding to the respective pixels of the image data on the second layer. Similarly, the changing module 12H changes the assigned positions of the nozzles 18 for the image data of each layer of the third and subsequent layers according to the number of layers indicated by the laminated image data, thereby generating the print data.

Specifically, the changing module 12H, while maintaining a correspondence between pixel positions of pixels indicated by the image data and positions of the dots corresponding to the pixels on the recording medium P, shifts in the main-scanning direction X the assigned positions of the nozzles 18 for recording the dots corresponding to the pixels at the pixel positions.

FIGS. 9A and 9B, and 10A and 10B illustrate the method for changing the assigned positions of the nozzles 18 in the recording unit 14 that employs the multi-pass system. FIGS. 9A and 9B, and 10A and 10B illustrate an exemplary case in which an identical line is printed reciprocatingly in four sequences. In the example illustrated in FIGS. 9A and 9B, and 10A and 10B, the recording unit 14 is reciprocated in the main-scanning direction X (see FIG. 2B). Additionally, in FIGS. 9A and 9B, and 10A and 10B, the recording unit 14 includes the nozzles 18 arranged in plurality ($18_1$ to $18_n$) (n is an integer of 2 or more) in the sub-scanning direction Y (see FIG. 2B).

Figure 9A:
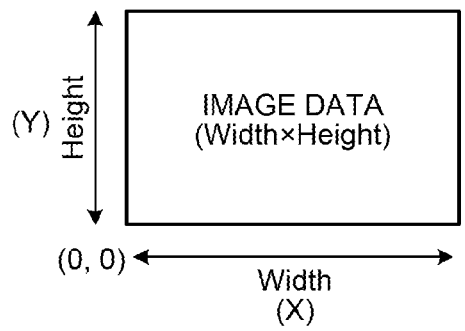
FIGS. 9A and 9B are diagrams illustrating a method for changing assigned positions of nozzles.
Figure 9B:
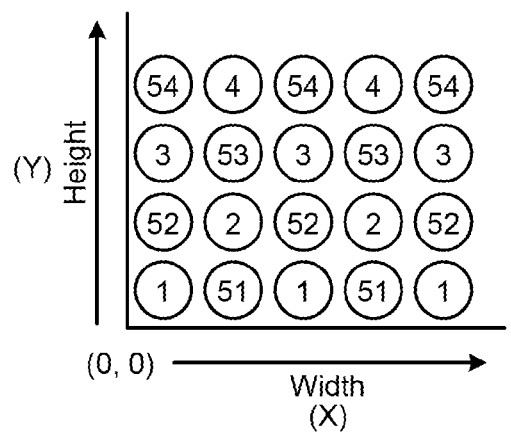

FIGS. 9A and 9B illustrate the nozzles 18 assigned by default to respective pixels that form laminated image data by the converting module 12G. FIG. 9A schematically illustrates image data for one layer in the laminated image data. FIG. 9B schematically illustrates the nozzles 18 for recording the dots corresponding to respective pixels, assigned by default by the converting module 12G to the image data of each layer. In FIG. 9B, encircled numbers denote the channels of the nozzles 18 arranged in the recording unit 14.

For example, when converting the image data acquired by the acquiring module 12A to print data, the converting module 12G assigns by default a predetermined nozzle 18 for recording the dot corresponding to each of the pixels that form the image data.

In the multi-pass system, the converting module 12G assigns a plurality of nozzles 18 in the main-scanning direction X that represents a direction in which the recording unit 14 travels. Specifically, the converting module 12G reads the image data for each pixel row (one line) extending in a direction corresponding to the sub-scanning direction Y (see FIG. 9A) and assigns a nozzle 18 identified by channel "1" to the pixel at a pixel position on a first end in the pixel row in the sub-scanning direction Y (see FIG. 9B). In addition, the converting module 12G assigns each of nozzles 18 identified by channels "52", "3", and "54" to a corresponding one of pixels arranged toward a second end in the sub-scanning direction Y (see FIG. 9B).

Additionally, as illustrated in FIG. 9B, with respect to the pixel row adjacent in the main-scanning direction X to the above-described pixel row extending in the sub-scanning direction Y, the converting module 12G assigns a nozzle 18 identified by channel "51" to the pixel at the pixel position on the first end in the pixel row in the sub-scanning direction Y. In addition, the converting module 12G assigns each of nozzles 18 identified by channels "2", "53", and "4" to a corresponding one of pixels arranged toward the second end in the sub-scanning direction Y. Assume that the foregoing assignment procedure is repeatedly performed.

Figure 10A:
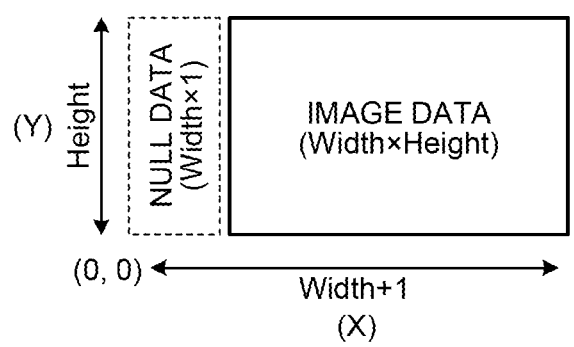
FIGS. 10A and 10B are diagrams illustrating a method for changing assigned positions of nozzles.
Figure 10B:
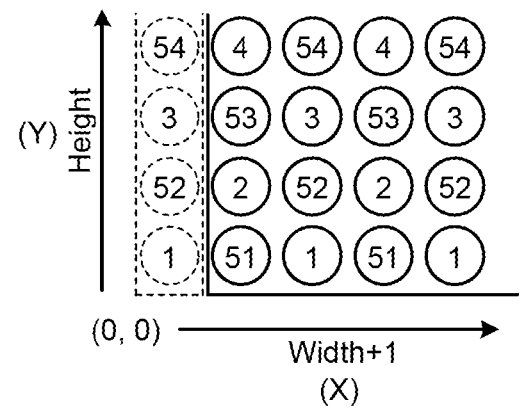

FIG. 10A illustrates image data on a second layer in the laminated image data. FIG. 10B schematically illustrates the image data on the second layer having the assigned positions of the nozzles 18 changed by the changing module 12H. In FIG. 10B, encircled numbers denote the channels of the nozzles 18 arranged in the recording unit 14.

As illustrated in FIG. 10A, the changing module 12H inserts null data for one line in the sub-scanning direction Y on a first end in the main-scanning direction X in the image data on the second layer. The changing module 12H thereby shifts by one nozzle the assigned positions of the nozzles 18 in the main-scanning direction X.

As illustrated in FIG. 10B, the changing module 12H thereby changes the assigned positions of the nozzles 18 for the image data on the second layer so as to shift by one nozzle in the sub-scanning direction Y the nozzles 18 for recording the dots corresponding to respective pixels of the image data on the first layer. Similarly, the changing module 12H changes the assigned positions of the nozzles 18 for the image data of each layer of the third and subsequent layers according to the number of layers indicated by the laminated image data, thereby generating the print data.

Specifically, the changing module 12H, while maintaining a correspondence between pixel positions of pixels indicated by the image data and positions of the dots corresponding to the pixels on the recording medium P, shifts in the sub-scanning direction Y the assigned positions of the nozzles 18 for recording the dots corresponding to the pixels at the pixel positions.

The example of FIGS. 9A and 9B, and 10A and 10B has been described for a case in which the assigned positions of the nozzles 18 are shifted in one direction. The changing module 12H may nonetheless change the assigned positions of the nozzles 18 in both the main-scanning direction X and the sub-scanning direction Y.

Figure 11A:
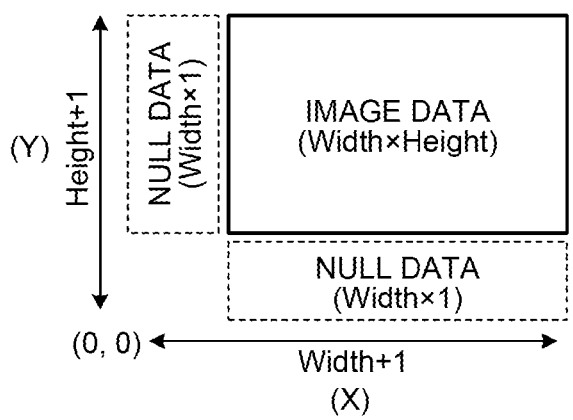
FIGS. 11A and 11B are diagrams illustrating a method for changing assigned positions of nozzles.
Figure 11B:
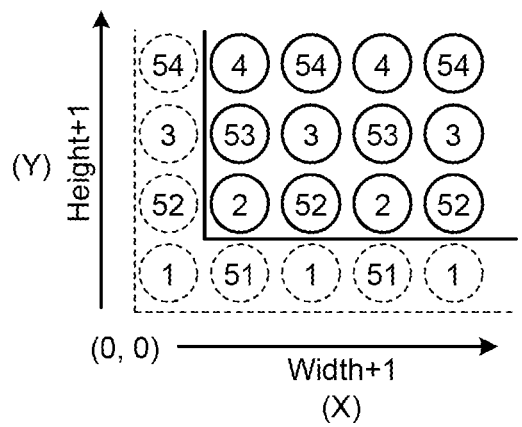

FIGS. 11A and 11B illustrate a case in which the assigned positions of the nozzles 18 are changed in both the main-scanning direction X and the sub-scanning direction Y. In the same way as in FIGS. 9A and 9B, and 10A and 10B, FIGS. 11A and 11B exemplify the recording unit 14 that employs the multi-pass system.

FIG. 11A illustrates image data on the second layer in the laminated image data. FIG. 11B schematically illustrates the nozzles 18 for recording the dots corresponding to respective pixels, assigned by the changing module 12H to the image data of the second layer. In FIG. 11B, encircled numbers denote the channels of the nozzles 18 arranged in the recording unit 14. Additionally, FIGS. 11A and 11B are based on the image data on the first layer illustrated in FIGS. 9A and 9B.

As illustrated in FIG. 11A, the changing module 12H inserts null data for one line in the sub-scanning direction Y on a first end in the main-scanning direction X in the image data on the second layer. The changing module 12H inserts null data for one line in the main-scanning direction X on a first end in the sub-scanning direction Y in the image data on the second layer. The changing module 12H thereby shifts by one nozzle each the assigned positions of the nozzles 18 in the main-scanning direction X and the sub-scanning direction Y.

As illustrated in FIG. 11B, the changing module 12H thereby changes the assigned positions of the nozzles 18 for the image data on the second layer so as to shift, by one nozzle each in the main-scanning direction X and the sub-scanning direction Y, the nozzles 18 for recording the dots corresponding to the respective pixels of the image data on the first layer. Similarly, the changing module 12H changes the assigned positions of the nozzles 18 for the image data of each layer of the third and subsequent layers according to the number of layers indicated by the laminated image data, thereby generating the print data.

Specifically, the changing module 12H, while maintaining a correspondence between pixel positions of pixels indicated by the image data and positions of the dots corresponding to the pixels on the recording medium P, shifts in the main-scanning direction X and the sub-scanning direction Y the assigned positions of the nozzles 18 for recording the dots corresponding to the pixels at the pixel positions.

The method for changing the assigned positions of the nozzles 18 by the changing module 12H is not limited to what has been described above.

FIGS. 12A to 12D illustrate another method for changing the assigned positions. FIGS. 12A to 12D illustrate the method for changing the assigned positions of the nozzles 18 in the recording unit 14 that employs the multi-pass system. FIGS. 12A to 12D illustrate an exemplary case in which an identical line is printed reciprocatingly in four sequences. In the example illustrated in FIGS. 12A to 12D, the recording unit 14 is reciprocated in the main-scanning direction X. Additionally, in FIGS. 12A to 12D, the recording unit 14 includes the nozzles 18 arranged in plurality ($18_1$ to $18_n$) (n is an integer of 2 or more) in the sub-scanning direction Y. In FIGS. 12A to 12D, encircled numbers denote the channels of the nozzles 18 arranged in the recording unit 14.

Printing an identical line in four reciprocating sequences in the multi-pass system involves four conditions of assigning the nozzles 18 in the main-scanning direction X, if the entire row of the nozzles 18 is to be simply shifted. It is here noted that a feed amount of the recording unit 14 in one pass is assumed to be equivalent to 50 nozzles 18. In this case, the changing module 12H can change the assigned positions of 50 nozzles 18 that are equivalent to the feed amount in one pass in the sub-scanning direction Y in which the nozzles 18 are arranged. In addition, the changing module 12H can shift the assigned positions in 200 different patterns (50 nozzles multiplied by four conditions) through combinations of shifting of the assigned positions in the main-scanning direction X and the sub-scanning direction Y.

For example, FIG. 12A illustrates a condition in which the assigned positions of the nozzles 18 are not shifted. Specifically, FIG. 12A illustrates the nozzles 18 for recording dots corresponding to respective pixels, assigned by default to the image data on respective layers by the converting module 12G. FIG. 12B illustrates a case in which the changing module 12H shifts the assigned positions of the nozzles 18 by one nozzle in the main-scanning direction X. FIG. 12C illustrates a case in which the changing module 12H shifts the assigned positions of the nozzles 18 by two nozzles in the main-scanning direction X. FIG. 12D illustrates a case in which the changing module 12H shifts the assigned positions of the nozzles 18 by three nozzles in the main-scanning direction X.

As such, the method for changing the assigned positions of the nozzles 18 by the changing module 12H is not limited to the above-described embodiment.

The embodiment has been described for a case in which the changing module 12H changes, in the laminated image data, the assigned positions corresponding to the respective pixels among different layers for all pixel rows out of a plurality of pixel rows extending in the direction in which the nozzles 18 are arranged. The changing module 12H may nonetheless change, in the laminated image data, the assigned positions corresponding to the respective pixels among different layers for part of pixel rows out of a plurality of pixel rows extending in the direction in which the nozzles 18 are arranged.

Reference is made back to FIG. 3. The changing module 12H may store in advance in the storage module 12E assignment information that specifies the assigned positions at random different among different layers. For example, the calculating module 12F may calculate in advance the assignment information that establishes, for each of different layers, the assigned positions at random different among the different layers and store in the storage module 12E the assignment information associated with information indicating the layer (the number of layers).

For each layer in the laminated image data, the changing module 12H reads from the storage module 12E the assignment information corresponding to each layer. The changing module 12H may then change the assigned positions of the nozzles 18 corresponding to the respective pixels for each layer using the read assignment information.

The output module 12D outputs the print data generated by the generating module 12C to the recording apparatus 30.

The recording apparatus 30 includes the recording unit 14, a recording control unit 28, the drive unit 26, and the irradiation unit 20. The recording unit 14, the drive unit 26, and the irradiation unit 20 have earlier been described and descriptions therefor will not be reiterated here.

The recording control unit 28 receives print data from the image processing apparatus 12. If the received print data is based on single-layer image data, the recording control unit 28 controls the recording unit 14, the drive unit 26, and the irradiation unit 20 such that a specific nozzle 18 assigned to each pixel ejects ink corresponding to the pixel to thereby record a dot corresponding to the pixel. Alternatively, if the received print data is based on laminated image data, the recording control unit 28 controls the recording unit 14, the drive unit 26, and the irradiation unit 20 such that, for the image data of each layer, a specific nozzle 18 assigned to each pixel ejects ink corresponding to the pixel to thereby record a dot corresponding to the pixel.

Figure 13:
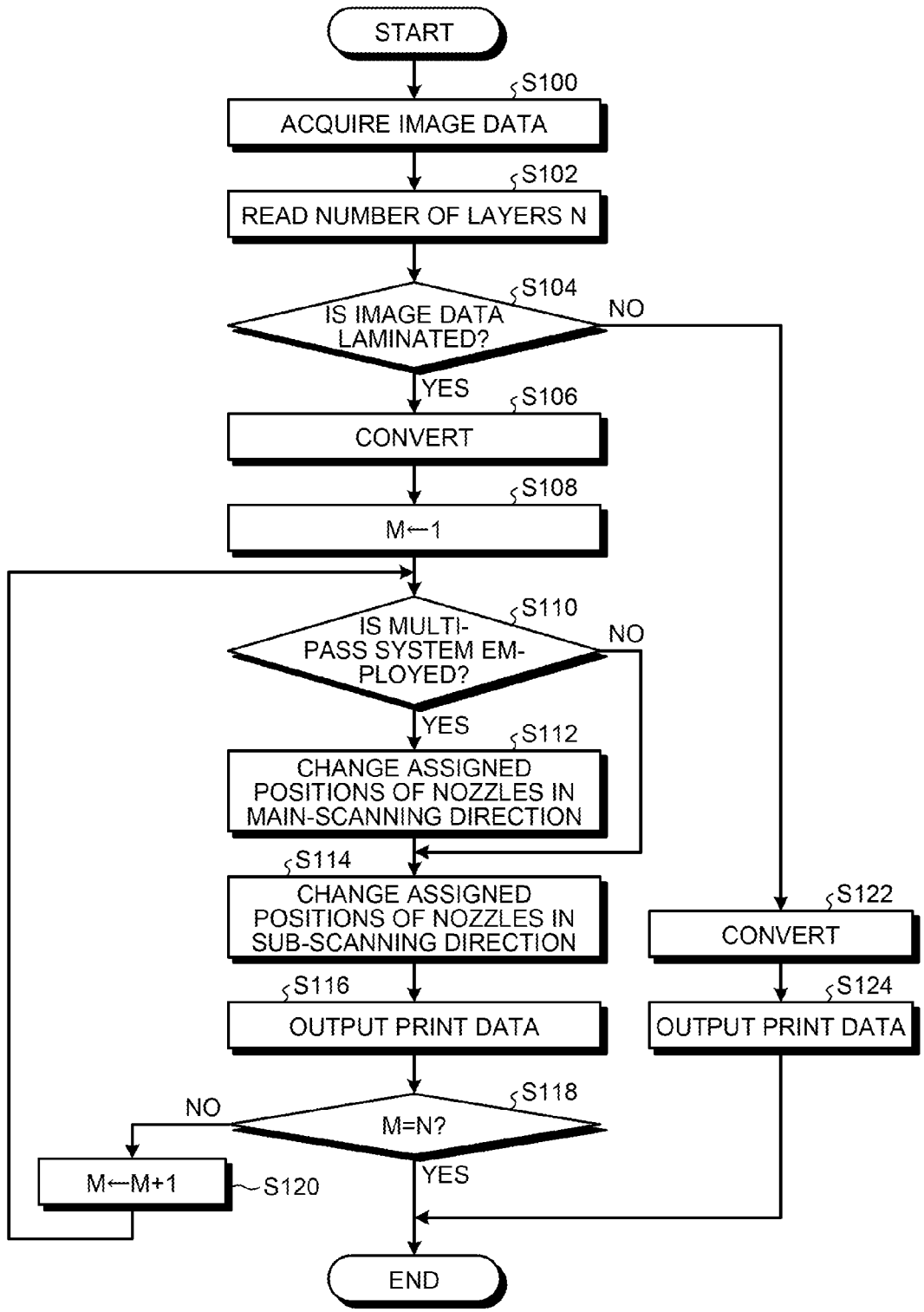
FIG. 13 is a flowchart illustrating image processing steps performed by a main controller.

The following describes image processing steps performed by the main controller 13 of the image processing apparatus 12. FIG. 13 is a flowchart illustrating the image processing steps performed by the main controller 13. The flowchart illustrated in FIG. 13 assumes that the nozzles 18 are arranged in the main-scanning direction X when the recording unit 14 employs the single-pass system. Alternatively, when the recording unit 14 employs the multi-pass system, the flowchart illustrated in FIG. 13 assumes that the nozzles 18 are arranged in the sub-scanning direction Y and the recording unit 14 reciprocates in the main-scanning direction X.

The acquiring module 12A acquires image data from, for example, an external device not illustrated (Step S100). The determining module 12B reads the number of layers N of the image data acquired at Step S100 (Step S102).

The determining module 12B then determines whether or not the image data acquired at Step S100 is laminated image data (Step S104). If the image data acquired at Step S100 is the laminated image data (Yes at Step S104), the converting module 12G converts image data of each of different layers included in the image data acquired at Step S100 to the raster format. The converting module 12G further assigns a specific nozzle 18 for recording a corresponding dot to each of pixels of the image data of each layer (Step S106).

The changing module 12H establishes a "first" layer as a layer M subject to change in the assigned positions of the nozzles 18 (Step S108).

The changing module 12H then determines whether or not the recording unit 14 employs the multi-pass system (Step S110). For example, the changing module 12H transmits a signal that indicates an inquiry inquiring about the system employed by the recording unit 14 to the recording apparatus 30 to which the print data is to be output. The changing module 12H then decodes a signal indicating the system received from the recording apparatus 30 to thereby make a decision at Step S110.

If the recording unit 14 employs the one-pass system (No at Step S110), Step S114 described below is performed. If the recording unit 14 employs the multi-pass system (Yes at Step S110), Step S112 is performed. The changing module 12H changes, in image data of the M-th layer, the assigned positions of the nozzles 18 for pixels in a pixel row extending in the main-scanning direction X of the recording unit 14 (Step S112). The method for changing the assigned positions has earlier been described and descriptions therefor will not be reiterated here.

The changing module 12H next changes, in the image data of the M-th layer, the assigned positions of the nozzles 18 for pixels in a pixel row extending in the sub-scanning direction Y of the recording unit 14 (Step S114). The method for changing the assigned positions has earlier been described and descriptions therefor will not be reiterated here. It is noted that the shifting amount in the sub-scanning direction Y in which the nozzles 18 are arranged may be determined according to the feed amount of the recording medium P in the sub-scanning direction Y. At this time, the shifting amount in the sub-scanning direction Y is adjusted such that the nozzle 18 that records dots corresponding to an identical pixel position varies between a first layer to a second layer adjacent to the first layer.

The changing module 12H then outputs the print data of the M-th layer generated by changing the assigned positions of the nozzles 18 to the recording apparatus 30 (Step S116).

The generating module 12C determines whether or not the layer M subject to change in the assigned positions of the nozzles 18 matches with the number of layers N read at Step S102 (Yes at Step S118). If there is a mismatch (No at Step S118), M is counted up by "1" (Step S120) and Step S110 is performed again. If there is a match (Yes at Step S118), this routine is terminated.

If Step S104 is answered in the negative and the image data acquired at Step S100 is single-layer image data, Step S122 is performed. At Step S122, the converting module 12G converts the single-layer image data acquired at Step S100 to the raster format. The converting module 12G further assigns a specific nozzle 18 for recording a corresponding dot to each of pixels of the image data (Step S122). The converting module 12G outputs the print data generated by the step of Step S122 to the recording apparatus 30 (Step S124) and this routine is then terminated.

As described above, in the image processing apparatus 12 according to the embodiment, the acquiring module 12A acquires image data of an image formed by the recording unit 14. The determining module 12B determines whether or not the image data is laminated image data. If the image data is the laminated image data, the generating module 12C generates print data that assigns the nozzles 18 for recording dots corresponding to respective pixels of the laminated image data such that a specific nozzle 18 for recording dots that correspond to pixels at an identical pixel position in the laminated image data varies from one layer to another.

This arrangement enables the image processing apparatus 12 according to the embodiment to minimize occurrence of surface irregularities as a result of, for example, accumulation of uneven ejection by the nozzles 18 ejecting ink, even when a large number of layers is involved of the laminated image formed by superimposing one dot on top of another as illustrated in FIGS. 6A and 6B.

The image processing apparatus 12 according to the embodiment thus can form a laminated image with minimally degraded image quality.

Additionally, the image processing apparatus 12 according to the embodiment can improve surface smoothness of the laminated image through simple image processing.

In addition, as compared with an arrangement in which a specific nozzle 18 for recording dots that correspond to pixels at an identical pixel position in the laminated image data remains unchanged among different layers, the image processing apparatus 12 according to the embodiment can minimize occurrence of surface irregularities of the laminated image, while maintaining productivity on a substantially equivalent level.

Use of ink containing the optically curable resin for the ink to be ejected can prevent variations in ultraviolet light emission time in an image plane of the laminated image.

The following describes a hardware configuration of the main controller 13 according to the embodiment.

The main controller 13 includes a CPU, a read only memory (ROM), a random access memory (RAM), a hard disk drive (HDD), a hard disk (HD), a network interface (I/F), and a control panel. The CPU, the ROM, the RAM, the HDD, the HD, the network I/F, and the control panel are connected to one another via a bus, so that the main controller 13 constitutes a hardware configuration incorporating an ordinary computer.

A program executed by the main controller 13 according to the embodiment for performing the above-described various types of processing is embedded and provided in a ROM, for example.

The program executed by the main controller 13 according to the embodiment for performing the above-described various types of processing may be recorded and provided in a non-transitory computer-readable recording medium such as a compact disc read only memory (CD-ROM), a flexible disk (FD), a compact disc recordable (CD-R), and a digital versatile disc (DVD), as an installable or executable file.

The program executed by the main controller 13 according to the embodiment for performing the above-described various types of processing may still be stored in a computer connected to a network such as the Internet and provided by being downloaded via the network. Furthermore, the program executed by the main controller 13 according to the embodiment for performing the above-described various types of processing may be provided or distributed via a network such as the Internet.

The program executed by the main controller 13 according to the embodiment for performing the above-described various types of processing has a modular configuration including the above-described functional units (the acquiring module 12A, the determining module 12B, the generating module 12C, the converting module 12G, the changing module 12H, the output module 12D, the storage module 12E, and the calculating module 12F). Each functional unit is loaded on a main storage and generated as actual hardware of the acquiring module 12A, the determining module 12B, the generating module 12C, the converting module 12G, the changing module 12H, the output module 12D, the storage module 12E, and the calculating module 12F on the main storage as a result of the CPU loading the corresponding program from a storage such as a ROM and executing the loaded program.

The present invention achieves an effect of being capable of generating print data that can form a laminated image with minimally degraded image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that outputs print data to a recording apparatus including a recording unit that causes each of a plurality of nozzles to eject droplets, the image processing apparatus comprising:
    an acquiring module that acquires image data for an image to be formed by the recording unit;
    a determining module that determines whether or not the image data is laminated image data formed of a plurality of layers; and
    a generating module that generates, when the image data is the laminated image data, the print data that assigns nozzles for recording dots corresponding to respective pixels of the laminated image data such that an assigned nozzle for recording a dot amongst dots that correspond to the respective layers of the laminated image data at a particular pixel position varies from that of another dot corresponding to another layer amongst the layers at the same particular pixel position.

2. The image processing apparatus according to claim 1, wherein
    the generating module includes a changing module that changes an assigned position of a nozzle corresponding to each of the pixels, and
    the changing module changes, for each layer in the laminated image data, the assigned position of the nozzle corresponding to each of the pixels of the laminated image data.

3. The image processing apparatus according to claim 2, wherein
    when the nozzles are arranged in at least either one of a main-scanning direction and a sub-scanning direction of the recording unit, the changing module changes the assigned position of the nozzle corresponding to each of the pixels of the laminated image data such that the nozzle for recording dots corresponding to pixels at the identical pixel position in the laminated image data is shifted, among different layers, in a predetermined shifting amount in a shifting direction that corresponds to at least one of the directions in which the nozzles are arranged.

4. The image processing apparatus according to claim 3, wherein the changing module specifies at least either one of the shifting direction and the shifting amount according to a print condition.

5. The image processing apparatus according to claim 3, wherein
    the changing module changes, among different layers in the laminated image data, the assigned positions corresponding to pixels that belong to, out of a plurality of pixel rows extending in the direction in which the nozzles are arranged, part of the pixel rows.

6. The image processing apparatus according to claim 2, further comprising:
    a storage module that stores therein assignment information that specifies the assigned positions for each of the layers, the assigned positions varying among the different layers, wherein
    the changing module changes, for each layer in the laminated image data, the assigned positions corresponding to pixels in the laminated image data on a basis of the assignment information corresponding to the layer.

7. A non-transitory computer-readable recording medium that contains an image processing program that causes a computer to execute:
    acquiring image data for an image to be formed by a recording unit that causes each of a plurality of nozzles to eject droplets to record dots;
    determining whether or not the image data is laminated image data formed of a plurality of layers; and
    generating, when the image data is the laminated image data, print data that assigns nozzles for recording dots corresponding to respective pixels of the laminated image data such that a specific nozzle for recording dots that correspond to pixels at an identical pixel position in the laminated image data varies from one layer to another.

8. An image processing method comprising:
    acquiring image data for an image to be formed by a recording unit that causes each of a plurality of nozzles to eject droplets to record dots;
    determining whether or not the image data is laminated image data formed of a plurality of layers; and
    generating, when the image data is the laminated image data, print data that assigns nozzles for recording dots corresponding to respective pixels of the laminated image data such that a specific nozzle for recording dots that correspond to pixels at an identical pixel position in the laminated image data varies from one layer to another.

* * * * *